No. 835,207. PATENTED NOV. 6, 1906.
F. H. VAN HOUTEN.
DOUGH DIVIDER.
APPLICATION FILED MAY 25, 1906.
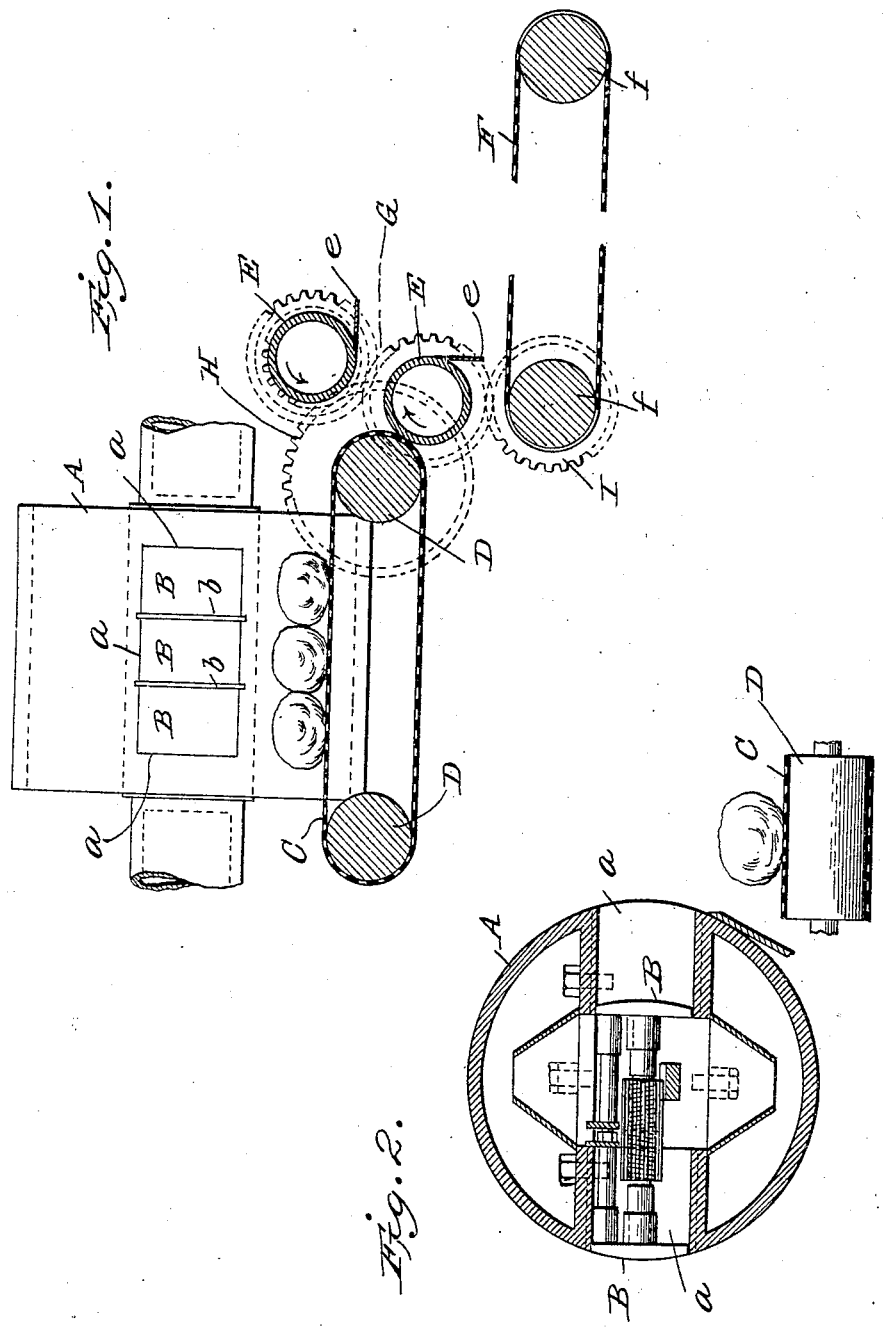
Witnesses
Edwin L. Yewell
Thomas Durant
Inventor
Frank H. Van Houten
By Church & Church
his Attorneys

UNITED STATES PATENT OFFICE.

FRANK HENRY VAN HOUTEN, OF FISHKILL-ON-THE-HUDSON, NEW YORK.

DOUGH-DIVIDER.

No. 835,207.

Specification of Letters Patent.

Patented Nov. 6, 1906.

Application filed May 25, 1906. Serial No. 318,711.

*To all whom it may concern:*

Be it known that I, FRANK HENRY VAN HOUTEN, a citizen of the United States, residing at Fishkill-on-the-Hudson, in the county of Dutchess and State of New York, have invented certain new and useful Improvements in Dough-Dividers; and I do hereby declare the following to be a full, clear, and exact description of the same, reference being had to the accompanying drawings, forming a part of this specification, and to the letters of reference marked thereon.

This invention relates to improvements in dough-dividers of that type wherein a number of measured portions of dough are simultaneously ejected from the measuring mechanism—as illustrated, for instance, in my prior patent, No. 788,123, dated April 25, 1905—the object of the present invention being to provide for separating the measured portions from each other a sufficient distance to prevent any possibility of coalescence and to present the said portions to the attendant or attendants in succession separated sufficiently to facilitate handling, &c.

Referring to the accompanying drawings, Figure 1 is a front sectional elevation of a portion of a dough-divider, showing the present improvements. Fig. 2 is a section in a plane at right angles to Fig. 1 and looking toward the right.

Similar letters of reference in both figures indicate like parts.

The measuring-head (indicated by the letter A) corresponds to the measuring-head of the before-mentioned patented machine, and, as will be understood from said patent, it is given an intermittent movement to bring its measuring-chambers $a$ alternately into receiving and discharging positions. The dough is subdivided into the desired number of measured portions by the partitions $b$, all of such measured portions, however, being discharged simultaneously by the advance of the plungers B.

In order to present the measured portions in succession to the attendant, a conveyer, preferably in the form of a belt C, is arranged in position to receive the dough discharged from the measuring-head and to convey the same to one side or with the several portions in succeeding order. The conveyer-belt usually runs over rollers or pulleys D and at one end discharges the dough to feed-rollers E. The feed-rollers E rotate in opposite directions and at a greater surface speed than the surface speed of the conveyer, whereby as each measured portion is acted on it is advanced much more rapidly than the portions remaining on the conveyer and is consequently separated therefrom by a distance depending upon the relative speed of the movements.

The lower feed-roller is preferably somewhat below the level of the top of the conveyer and runs very close to or in contact therewith, and both feed-rollers are preferably provided with scrapers $e$ for preventing adherence of the dough.

Below the feed-rollers and in position to receive the dough therefrom is a second conveyer, preferably also in the form of a belt F, and on which the dough is carried off into convenient position to be removed by the attendant or attendants. The conveyer-belt F also runs on rollers or pulleys $f$ and has a movement somewhat more rapid than the conveyer C in order that the separated portions of dough may be kept separated.

The feed-rollers are preferably connected by gearing, (indicated at G,) and the conveyer-belts are connected therewith by gearing H and I, said gearing being so proportioned as to give the differential speeds desired.

In operation the portions of dough as they move into position to be acted on by the feed-rollers are quickly drawn away from the succeeding portions and dropped onto the second conveyer. They are carried away by the latter in widely-spaced relation to each other.

It is preferred in practice to so time the movements that the second conveyer will carry a practically-continuous succession of portions, all spaced apart approximately equal distances, whereby the attendants may work to the greatest advantage and no time be lost in placing the portions in packing-receptacles or working the same in preparation for baking.

Having thus described my invention, what I claim as new, and desire to secure by Letters Patent, is—

1. In a dough-divider, the combination with a measuring-head and means for simultaneously discharging a number of measured portions of dough therefrom, of a conveyer onto which the measured portions are discharged, a feed-roll having a higher surface speed than the conveyer for separating the measured portions and a second conveyer onto which the separated portions are delivered by the feed-roll; substantially as described.

2. In a dough-divider, the combination with a measuring-head and means for simultaneously discharging a number of measured portions of dough therefrom, of a conveyer-belt onto which the measured portions are discharged, a pair of feed-rolls to which the portions are delivered in succession by the conveyer-belt and a second conveyer-belt to which the measured portions are delivered in succession by the feed-rolls.

3. In a dough-divider the combination with the measuring-head and means for simultaneously discharging therefrom a number of measured portions of dough, of a conveyer-belt onto which said portions are discharged from the measuring-head, a second conveyer-belt and a feed-roll intermediate said conveyer-belts, the feed-roll and second conveyer-belt having a higher surface speed than the first-mentioned conveyer-belt.

FRANK HENRY VAN HOUTEN.

Witnesses:
J. E. VAN HOUTEN,
C. VAN NOSTRAN.